Patented Dec. 2, 1941

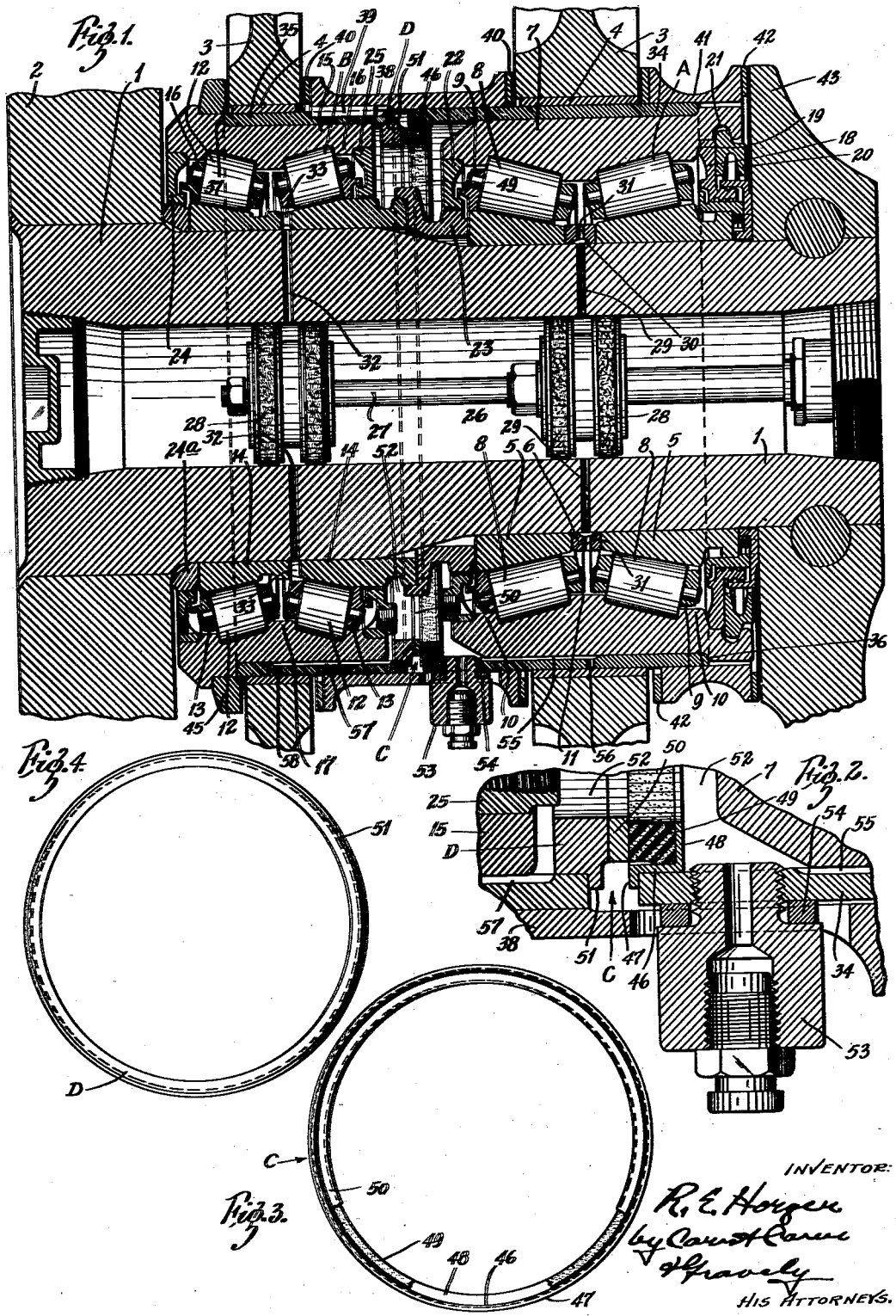

2,264,530

UNITED STATES PATENT OFFICE 2,264,530

LOCOMOTIVE ROD BEARING

Ralph E. Horger, Canton, Ohio, assignor to The Timken Roller Bearing Company, Canton, Ohio, a corporation of Ohio Application February 3, 1941, Serial No. 377,105

14 Claims. (Cl. 308—187)

This invention relates to locomotive rod bearing constructions of the kind wherein separate roller bearings are mounted on the locomotive crank pin and the outer raceway members of said bearings function as journals for the rod bushings. The invention has for its principal objects to provide the outer raceway members of the bearings with replaceable sleeves that serve to relieve said raceway members of their function as journals for the rod bushings, to adapt the journal sleeves of adjacent bearings for co-operation with each other and with said bearings to form a reservoir for supplying lubricant to the cooperating surfaces of said rod bushings and journal sleeves and to provide for simplicity and cheapness of construction and the easy assembly and disassembly of the parts. The invention consists in the parts and in the arrangements and combinations of parts hereinafter described and claimed.

In the accompanying drawing, which forms part of this specification and wherein like symbols refer to like parts wherever they occur, Fig. 1 is a central horizontal section through a locomotive rod bearing construction embodying my invention, Fig. 2 is an enlarged fragmentary section similar to Fig. 1, Fig. 3 is an end view of the annular face seal for closing the space or joint between the adjacent ends of the journal sleeves of the two roller bearings; and Fig. 4 is a similar view of the annular seat for said face seal.

In the accompanying drawing, my invention is illustrated in connection with a locomotive rod bearing construction comprising a crank pin or shaft 1 rigid with a driving wheel 2, two rotary antifriction bearings, preferably double, taper roller bearings A and B mounted one on the reduced outer end portion of said crank pin and the other on the larger inner end portion thereof and one or more drive rods 3 that have bearing bushings 4 press-fitted therein and are rotatably supported on the respective bearings. The outermost roller bearing A comprises two cones or inner raceway members 5 that are pressfitted on the crank pin with a spacing sleeve 6 therebetween, and a common, doubly coned cup or outer bearing member 7 and two series of tapered rollers 8 between each cone and said cup with a suitable retaining cage 9 for each series of rollers. The bearing cup or outer raceway member 7 has internal annular thrust ribs 10 near the ends thereof for the remote or large ends of the roller 8 and a single internal annular guide rib 11 midway between said thrust ribs for the adjacent or small ends of said rollers. The innermost roller bearing likewise comprises two series of conical rollers 12, with suitable retaining cages 13 therefor, interposed between cones or inner raceway members 14 mounted on the crank pin 1 and a common, doubly coned cup or outer raceway member 15 having internal annular end thrust ribs 16 and an internal annular intermediate guide rib 17.

The annular space between the inner and outer raceway members of the outermost roller bearing A is closed at the outer end thereof preferably by an annular end closure plate 18 that is held against an annular seat 19 provided therefor in the outer raceway member 7 by means of a locking ring 20 that seats in an internal annular groove 21 provided therefor in said outer raceway member. The annular space between the inner and outer raceway members of the outermost roller bearing A is closed at the inner end thereof by means of an annular end closure plate 22 that is pressfitted in the inner end of the outer raceway member 7 and has a close fit around a sleeve 23 that surrounds the crank pin 1 between and in endwise abutting relation to the adjacent ends of the innermost cone of said outermost bearing and the outermost cone of the innermost bearing B and thus serves to space the two bearings apart on said crank pins. The annular space between the inner and outer raceway member of the innermost bearing B is closed at the inner and outer ends thereof by annular end closure plates 24 and 25, respectively, similar to the annular end closure 22 for the inner end of the outermost bearing A. The end closure 24 has a close fit around an annular spacer 24a sleeved on the crank pin 1 between the innermost bearing cone of the innermost bearing B and the wheel 2; and the end closure 25 has a close fit around the outer end portion of the outermost cone of said bearing.

The annular space between the inner and outer raceway members of each bearing is supplied with lubricant from an axial reservoir 26 in the crank pin 1. The axial reservoir 26 is supplied with lubricant from the outer end of the crank pin 1 through a suitable feed tube 27 having suitable means 28 for retarding the flow of lubricant from the axial reservoir to the respective bearings. The lubricant flows from the reservoir 26 to the outermost bearing A through radial passageways 29 in the crank pin 1, thence into an internal annular groove 30 in the spacing sleeve 6 between the two cones or inner raceway members 5 of said bearing and thence through radial holes 31 in said sleeve into the annular space between the inner and outer raceway members of said bearing. The lubricant flows from the axial reservoir 26 in the crank pin 1 to the innermost bearing B through radial passageways 32 in said crank pin and thence through circumferentially spaced notches 33 in the inner end of the outermost raceway members of said bearing into the annular space between the inner and outer raceway members thereof.

Pressfitted or shrunk on or otherwise rigidly secured to the outer raceway member 7 of the outermost bearing A is a replaceable steel sleeve 34 having a hardened outer surface that constitutes a journal for the bearing bushing 4 of the locomotive drive rod 3 supported on said bearing. A similar replaceable steel sleeve 35 is pressfitted on the outer raceway member 15 of the innermost bearing B and constitutes a journal for the rod end bushing 4 supported on said innermost bearing. The journal sleeve 34 for the outermost bearing A is disposed with its outer end in endwise abutting relation to an external annular shoulder 36 provided therefor on the outer raceway member 7 of said bearing and with its inner end portion extending inwardly beyond the inner end of said outer raceway member. The journal sleeve 35 for the innermost bearing B is disposed with its inner end in abutting relation to an external annular shoulder 37 provided therefor in the outer raceway member 15 of said bearing and with its outer end portion extending outwardly beyond said outer raceway member and terminating short of the inner end of the journal sleeve 34 of the outer bearing A.

Located between the drive rods 3 is a spacing sleeve 38 that surrounds the adjacent end portions of the journal sleeves 34 and 35 of the two bearings and spans the space therebetween. The spacing sleeve 38 is secured to one of the journal sleeves, preferably the innermost sleeve 35, against rotary movement relative thereto by means of a key 39. The rod spacing sleeve 38 has bronze wear rings 40 welded to its rod opposing ends. A rod spacing sleeve 41 having bronze wear rings 42 on the ends thereof is sleeved on the journal sleeve 34 of the outermost bearing A between the outermost drive rod 3 and the eccentric crank 43 of the locomotive valve gear (not shown), said crank being pinned on the outer end of the crank pin 1 and serving to retain said rod abutment sleeve of said journal sleeve. Sleeved on the inner end of the outer raceway member 15 of the innermost bearing B between an annular shoulder thereon and the innermost drive rod 3 is a rod abutment ring 45.

The space or joint between the opposing or adjacent ends of the journal sleeves 34 and 35 of the respective bearings A and B is closed by means of an annular face seal, indicated generally by C, that fits in the inner end of the journal sleeve 34 of the outermost bearing and bears endwise against an annular seat or bushing member D mounted in the outer end of the journal sleeve 35 of the innermost bearing B. The seal C comprises a pressed steel ring 46 that has a pressfit in the inner end of the journal sleeve 34 of the outer bearing A and has at its outer end an outstanding flange 47, which abuts against the inner end of said journal sleeve and thus limits the inward movement of the ring therein, at its inner end an inwardly projecting flange 48, which forms a seat for a flexible ring 49 of treated rubber or synthetic rubber such as neoprene. The flexible ring 49 is bonded, as by vulcanizing, to the pressed steel supporting ring 46 therefor and has a sealing ring 50 of bronze or other suitable material permanently secured to its outer end face preferably by vulcanizing said flexible ring to said bronze ring. The bronze sealing ring 50 bears endwise against the flat outer end face of the annular member D which is made in the form of a hardened steel ring or bushing that is pressfitted in the outer end of the journal sleeve 35 of the innermost bearing B and has an external annular shoulder 51 that abuts endwise against said end of said journal sleeve and thus limits the inward movement of the member D therein.

By the arrangement described, the journal sleeves 34 and 35 are operatively connected by the seal C and cooperate to form the cylindrical outside wall of an annular lubricant chamber 52 between the adjacent ends of the bearings A and B, the inner cylindrical wall of said chamber being formed by the outermost inner raceway member of the innermost bearing B and the spacing sleeve 23 between said raceway member and the innermost inner raceway member of the outermost bearing A, and the end walls of said chamber being formed by the adjacent ends of the outer raceway members of the two bearings and the adjacent end closures 22 and 25 thereof. The end closures 22 and 25 separate the lubricant supplied to the bearings A and B by the axial reservoir 26 in the crank pin 1 from the annular reservoir between said bearings. As shown in the drawing, lubricant is supplied to the annular reservoir 52 through a suitable pressure feed fitting 53 having a reduced inner end that is threaded into a hole provided therefor in the journal sleeve 34 of the outermost bearing A. A suitable lock washer 54 is sleeved on the reduced inner end of the fitting 53 between the shoulder formed thereby and the outer surface of the journal sleeve 34; and the rod spacing sleeve 38 has an opening therein for said washer. Lubricant is conveyed from the annular lubricant reservoir 52 between the two roller bearings to the cooperating surfaces of the journal sleeve 34 of the outermost bearing A and the rod end bushing 4 journaled thereon through series of circumferentially spaced longitudinal grooves 55 formed in the inner periphery of said sleeve. These lubricant supply grooves or passageways 55 lead from the annular reservoir 52 to radial discharge holes 56 that extend through the wall of the journal sleeve 34 substantially midway of the ends of the main rod bushing. Lubricant is likewise conveyed from the annular reservoir 52 to the cooperating surfaces of the journal sleeve 35 of the innermost bearing B and the rod end bushing 4 journaled thereon through a series of circumferentially spaced longitudinal grooves 57 formed in the inner periphery of said sleeve, these supply grooves leading from said reservoir to radial discharge holes 58 that extend through the wall of the journal sleeve substantially midway of said rod end bushing.

The hereinbefore described bearing construction has several important advantages. The outer raceway members of the bearings are protected and strengthened by the steel sleeves thereon which constitute the journals for the rod end bushings and thus entirely relieve the outer surfaces of said raceway members of wear and eliminate the necessity for regrinding such surfaces. The journal sleeve of each bearing is pressfitted or shrunk on the outer raceway member thereof and its outside surface may be ground after said sleeve is mounted on said raceway member. When the journal sleeve of either bearing becomes worn or damaged, it may be removed by pulling or slitting and replaced with a new sleeve. Thus there is no outside wear on the outer raceway members of the bearings and replacement of the journal sleeves and rod bushings is easily accomplished. The flexible seal prevents leakage of lubricant through the joint or space between the adjacent ends of the journal sleeves of the two bearings and at the same time permits relative rotary movement of the journal sleeves of the two bearings. The sealed end portions of the journal sleeves of the two bearings cooperate with the adjacent ends thereof and spacing ring therefor to form an annular chamber or reservoir for the lubricating system for the rod end bushings; and this system is entirely separate from the lubricating system for the two roller bearings and is readily accessible to the engineman during a station stop.

Obviously, the hereinbefore described invention admits of considerable modification. Therefore, I do not wish to be limited to the precise construction shown and described.

What I claim is:

1. A bearing construction comprising a shaft, longitudinally spaced rotary antifriction bearings on said shaft, journal sleeves mounted on the respective bearings, members having bearings journaled on said journal sleeves, means for sealing the joint between adjacent ends of said journal sleeves, whereby said journal sleeves are adapted to enclose the space between said bearings to form a closed lubricant reservoir, and lubricant supply passageways leading from said reservoir to the cooperating surfaces of the journal sleeves of the respective bearings and the members journaled thereon.

2. A bearing construction comprising a shaft, rotary antifriction bearings on said shaft, a sleeve mounted on said shaft between and in abutting relation to adjacent ends of said bearings for spacing said bearings apart longitudinally of said shaft, separate journal sleeves mounted on said bearings, members journaled on said journal sleeves, means for sealing the joint between adjacent ends of said journal sleeves, whereby said journal sleeves are adapted to cooperate with said adjacent ends of said bearings and the spacing sleeve therebetween to form a closed annular lubricant chamber, and passageways leading from said reservoir to the cooperating surfaces of said journal sleeves and the members journaled thereon.

3. A bearing construction comprising a shaft, longitudinally spaced rotary antifriction bearings on said shaft, journal sleeves mounted on the respective bearings, members having bearings journaled on said journal sleeves, means for sealing the joint between adjacent ends of said journal sleeves, whereby said journal sleeves are adapted to enclose the space between said bearings to form a close lubricant reservoir, and lubricant supply passageways leading from said reservoir to the cooperating surfaces of the journal sleeves of the respective bearings and the members journaled thereon, said sealing means comprising a supporting ring mounted in one of said sleeves, an elastic ring and a sealing ring, said elastic ring being secured to said supporting and sealing rings, and a ring mounted in the other journal sleeve and constituting a seat for said sealing ring.

4. A bearing construction comprising a shaft, having a lubricant reservoir therein, longitudinally spaced rotary lubricant retaining antifriction bearings on said shaft, lubricant supply passageways leading from said reservoir to the respective bearings, separate journal sleeves mounted on said bearings, members having bearings journaled on said journal sleeves, means for sealing the joint between adjacent ends of said journal sleeves, whereby said journal sleeves are adapted to enclose the space between said bearings to form a closed lubricant reservoir, and lubricant supply passageways leading from said last mentioned reservoir to the cooperating surfaces of the journal sleeves of the respective bearings and the members journaled thereon.

5. A bearing construction comprising a shaft, having a lubricant reservoir therein, longitudinally spaced rotary lubricant retaining antifriction bearings on said shaft, lubricant supply passageways leading from said reservoir to the respective bearings, separate journal sleeves mounted on said bearings, members having bearings journaled on said journal sleeves, means for sealing the joint between adjacent ends of said journal sleeves while permitting relative rotary movement thereof, whereby said journal sleeves are adapted to enclose the space between said bearings to form a closed lubricant reservoir, lubricant supply passageways leading from said last mentioned reservoir to the cooperating surfaces of the journal sleeves of the respective bearings and the members journaled thereon, and a pressure feed fitting mounted on one of said journal sleeves in communication with said last mentioned reservoir.

6. A bearing construction comprising a shaft having a lubricant reservoir therein, longitudinally spaced rotary lubricant retaining bearings mounted on said shaft, passageways leading from said reservoir to the respective bearings, journal sleeves mounted on the respective bearings and having bearings journaled on the journal sleeves thereof, means for sealing the joint between adjacent ends of said journal sleeves, whereby said journal sleeves are adapted to enclose the space between said bearings to form a closed lubricant reservoir therefor, and passageways leading from said last mentioned reservoir to the cooperating surfaces of the journal sleeves of the respective bearings and the rod bearings supported therein.

7. A bearing construction comprising a shaft having a lubricant reservoir therein, longitudinally spaced rotary antifriction bearings on said crank pin, each of said bearings comprising relatively rotatable inner and outer raceway members, bearing members interposed between said raceway member and end closures for the annular space between said raceway members, passageways leading from said reservoir to the annular space between the inner and outer raceway members of each bearing, journal sleeves rigidly mounted on the outer raceway members of the respective bearings, members journaled on said journal sleeves, means for sealing the joints between adjacent ends of said journal sleeves, whereby said journal sleeves are adapted to enclose the space between said bearings to form a closed lubricant reservoir, and passageways leading from said last mentioned reservoir to the cooperating surfaces of the journal sleeves and the members journaled thereon.

8. A locomotive rod bearing construction comprising a crank pin, longitudinally spaced rotary antifriction bearings on said crank pin, journal sleeves mounted on the respective bearings, drive rods journaled on said journal sleeves, means for sealing the joint between the adjacent ends of said journal sleeves, whereby said journal sleeves are adapted to enclose the space between said bearings to form a closed lubricant reservoir, and passageways leading from said reservoir to the cooperating surfaces of said journal sleeves and the drive rods journaled thereon.

9. A locomotive rod bearing construction comprising a crank pin, rotary antifriction bearings on said crank pin, a spacing sleeve surrounding said crank pin between and in endwise abutting relation to adjacent ends of said bearings, journal sleeves mounted on the respective bearings, drive rods supported on the respective bearings and having bearings journaled on the journal sleeves thereof, means for sealing the joints between adjacent ends of said journal sleeves, whereby said journal sleeves are adapted to cooperate with said adjacent ends of said bearings and said spacing sleeve to form a closed annular lubricant reservoir, and passageways leading from said annular reservoir to the cooperating surfaces of the journal sleeves of the respective bearings and the rod bearings supported thereon.

10. A locomotive rod bearing construction comprising a crank pin having a lubricant reservoir therein, longitudinally spaced rotary antifriction bearings on said crank pin, passageways leading from said reservoir to the respective bearings, journal sleeves mounted on the respective bearings, drive rods having bearings journaled on said journal sleeves, means for sealing the joint between adjacent ends of said journal sleeves, whereby said journal sleeves are adapted to enclose the space between said bearings to form a closed lubricant reservoir, and passageways leading from said last mentioned reservoir to the co-operating surfaces of the journal sleeves of the respective bearings and the rod bearings supported thereon, said sealing means comprising a supporting ring mounted in one end of one of said journal sleeves, an elastic ring and a sealing ring, said elastic ring being secured to said supporting and sealing rings and constituting therewith a self-contained unit, and a ring mounted in the adjacent end of the other journal sleeve in position to form a seat for said sealing ring.

11. A locomotive rod bearing construction comprising a crank pin having a lubricant reservoir therein, longitudinally spaced rotary lubricant retaining antifriction bearings on said crank pin, passageways leading from said reservoir to the respective bearings, journal sleeves mounted on the respective bearings, drive rods having bearings journaled on said journal sleeves, means for sealing the joint between adjacent ends of said journal sleeves, whereby said journal sleeves are adapted to enclose the space between said bearings to form a closed lubricant reservoir therefor, and passageways leading from said last mentioned reservoir to the cooperating surfaces of the journal sleeves of the respective bearings and the rod bearings supported thereon.

12. A locomotive rod bearing construction comprising a crank pin, longitudinally spaced rotary antifriction bearings on said crank pin, each of said bearings comprising relatively rotatable inner and outer raceway members, bearing rollers interposed between said raceway members and end closures for the annular space between said raceway members, separate journal sleeves rigidly mounted on the outer raceway members of said bearings, drive rods having bearings rotatable on said journal sleeves, means for sealing the joint between adjacent ends of said journal sleeves, whereby said journal sleeves are adapted to enclose the space between bearings to form a closed lubricant reservoir, and passageways leading from said reservoir to the cooperating surfaces of said journal sleeves and the rod bearings supported thereon.

13. A locomotive rod bearing construction comprising a crank pin having a lubricant reservoir therein, rotary antifriction bearings on said crank pin, each of said bearings comprising relatively rotatable inner and outer raceway members, bearings interposed between said raceway members and closures for the annular space between said raceway members, a spacing sleeve surrounding said crank pin between and in endwise abutting relation to adjacent ends of the inner raceway members of the respective bearings, passageways leading from said reservoir to the annular space between the inner and outer raceway members of the respective bearings, journal sleeves rigidly mounted on the outer raceway members of the respective bearings, drive rods having bearings journaled on said journal sleeves, means for sealing the joints between adjacent ends of said journal sleeves, whereby said journal sleeves are adapted to cooperate with the adjacent ends of said bearings and said spacing sleeve to form a closed annular lubricant reservoir, and passageways leading from said annular reservoir to the co-operating surfaces of the journal sleeves of the respective bearings and the rod bearings supported thereon.

14. A locomotive rod bearing construction comprising a crank pin having an axial lubricant reservoir therein, longitudinally spaced rotary anti-friction bearings on said crank pin, each of said bearings comprising relatively rotatable inner and outer raceway members, bearing rollers interposed between said raceway members and end closures for the annular space between said raceway members, passageways leading from said reservoir to the annular spaces between the inner and outer raceway members of the respective bearings, separate journal sleeves rigidly mounted on the outer raceway members of said bearings, drive rods having bearings rotatable on said journal sleeves, means for sealing the joint between adjacent ends of said journal sleeves, whereby said journal sleeves are adapted to enclose the space between bearings to form a closed lubricant reservoir, passageways leading from said reservoir to the cooperating surfaces of said journal sleeves and the rod bearings supported thereon, and a spacing sleeve surrounding adjacent end portions of said journal sleeves between the drive rods thereon and covering the joints therebetween, said spacing sleeve being non-rotatably secured to one of said journal sleeves.

RALPH E. HORGER.